US010368628B1

(12) United States Patent
Durfee, Jr.

(10) Patent No.: US 10,368,628 B1
(45) Date of Patent: Aug. 6, 2019

(54) CELL PHONE ACCESSORIES

(71) Applicant: David L. Durfee, Jr., Meadville, PA (US)

(72) Inventor: David L. Durfee, Jr., Meadville, PA (US)

(*) Notice: Subject to any disclaimer, the term of this patent is extended or adjusted under 35 U.S.C. 154(b) by 82 days.

(21) Appl. No.: 15/611,520

(22) Filed: Jun. 1, 2017

(51) Int. Cl.
| *A45F 5/00* | (2006.01) |
| *A45C 1/06* | (2006.01) |
| *A45C 11/18* | (2006.01) |
| *H04B 1/3888* | (2015.01) |
| *A45C 11/00* | (2006.01) |

(52) U.S. Cl.
CPC ............... *A45F 5/00* (2013.01); *A45C 1/06* (2013.01); *A45C 11/182* (2013.01); *H04B 1/3888* (2013.01); *A45C 2001/065* (2013.01); *A45C 2011/002* (2013.01); *A45F 2005/002* (2013.01); *A45F 2005/008* (2013.01); *A45F 2200/0516* (2013.01)

(58) Field of Classification Search
CPC ............... A45F 5/00; A45F 2005/002; A45F 2005/008; A45F 2200/0516; A45C 1/06; A45C 11/182; A45C 2001/002; A45C 2001/065; H04B 1/3888
See application file for complete search history.

(56) References Cited

U.S. PATENT DOCUMENTS

| 8,047,364 | B2* | 11/2011 | Longinotti-Buitoni ............... A45C 11/00 206/320 |
| 8,887,910 | B2* | 11/2014 | Ashley ............... A45C 11/00 206/320 |
| 8,960,634 | B2* | 2/2015 | Le Gette ............... F16M 11/04 248/163.1 |
| 9,219,516 | B2* | 12/2015 | Haymond ............ H04B 1/3888 |
| 9,413,412 | B2* | 8/2016 | Gipson ............... H04B 1/3888 |
| 2009/0219677 | A1* | 9/2009 | Mori ............... A45F 3/14 361/679.03 |
| 2011/0077061 | A1* | 3/2011 | Danze ............... H04M 1/185 455/575.1 |
| 2012/0037285 | A1* | 2/2012 | Diebel ............... G06F 1/1626 150/165 |
| 2013/0009413 | A1* | 1/2013 | Chiu, Jr. ............... A45F 5/021 294/142 |
| 2014/0049060 | A1* | 2/2014 | Rayner ............... A45F 5/10 294/25 |
| 2014/0251368 | A1* | 9/2014 | Lawson ............... A45C 11/00 132/287 |
| 2015/0318885 | A1* | 11/2015 | Earle ............... H04B 1/385 455/575.6 |

(Continued)

*Primary Examiner* — Corey N Skurdal
(74) *Attorney, Agent, or Firm* — Richard K. Thomson

(57) ABSTRACT

A strap is provided which may be attached to a rear portion of the casing of a cell phone obviating the need for a user to wrap her/his hand around the phone. A plurality of embodiments depict different quick-change ways of attaching the strap to the casing or directly to the back of a cell phone. A quick-removal holster is also described, as is a belt clip which engages the strap without the need to grasp the phone casing. The case is provided with a compartment for 2-3 credit card-sized items. A retractable kick stand forms a hood over the compartment providing physical and visual protection to the contents of the compartment and a pusher is provided to facilitate removal of the items.

9 Claims, 27 Drawing Sheets

(56) References Cited

U.S. PATENT DOCUMENTS

| 2016/0072933 | A1* | 3/2016 | Cox, III | ............... | H04M 1/185 |
| | | | | | 455/575.8 |
| 2017/0099922 | A1* | 4/2017 | Guerdrum | ............... | A45F 5/021 |

\* cited by examiner

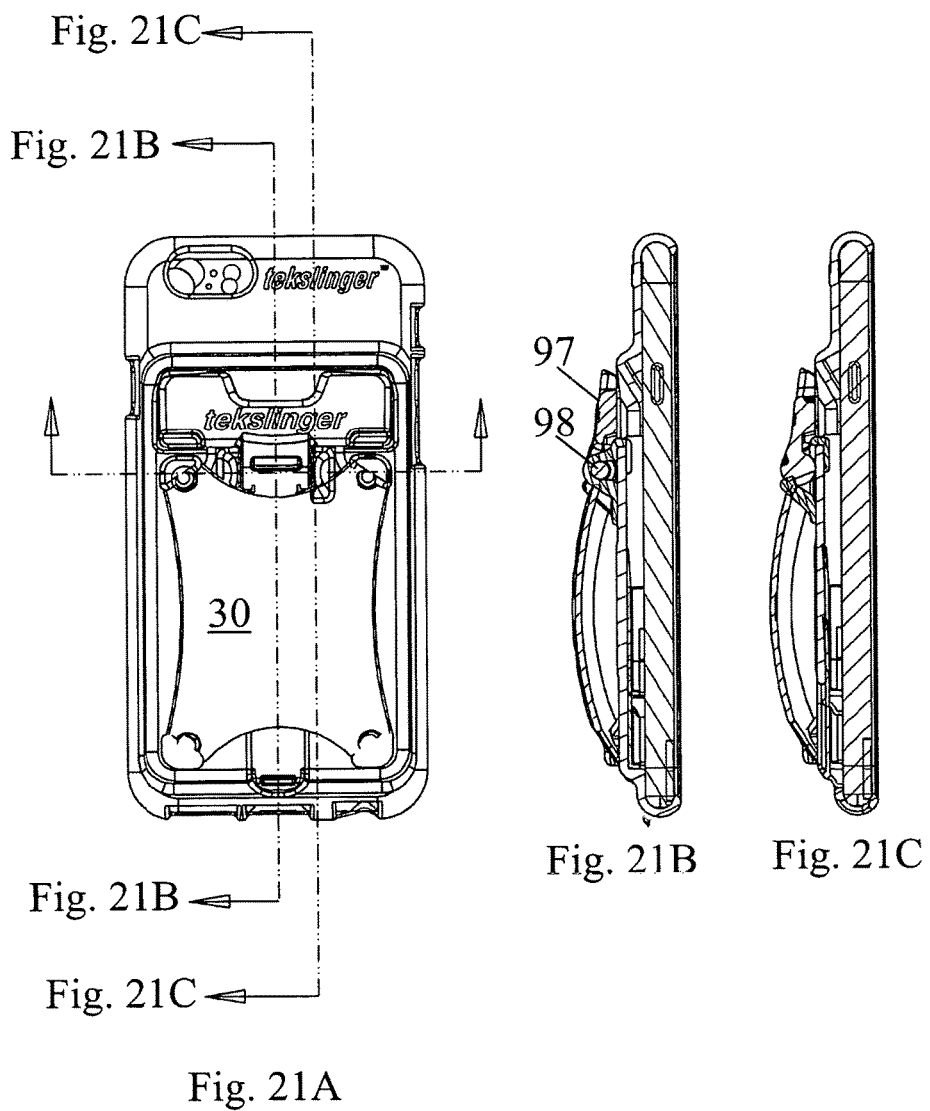

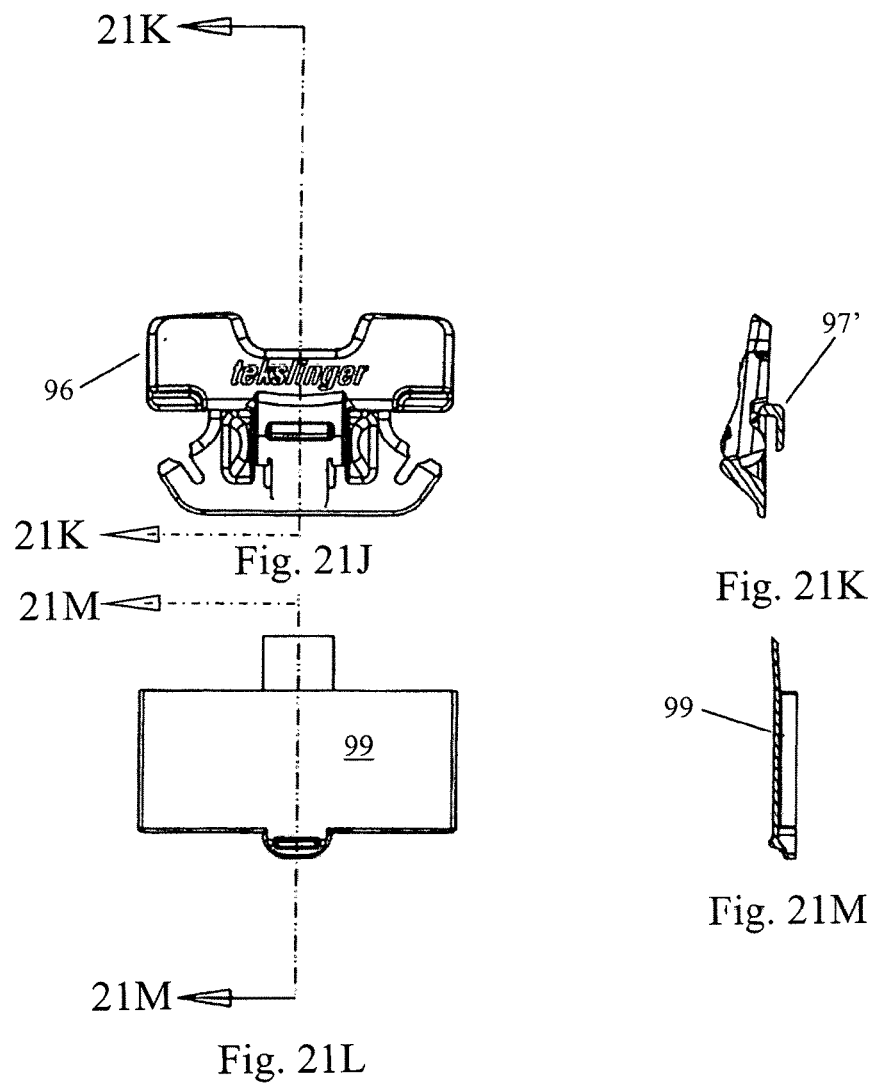

CELL PHONE ACCESSORIES

This application is a continuation-in-part of U.S. patent application Ser. No. 15/182,916 filed Jun. 16, 2016, which is a continuation-in-part of U.S. patent application Ser. No. 14/731,350 filed Jun. 4, 2015 which claims the priority benefit of provisional patent application 62/007,568 filed Jun. 4, 2014.

BACKGROUND AND SUMMARY OF THE INVENTION

The present invention is directed to the field of mobile communications. More particularly, this invention is directed to accessories attachable to mobile devices, particularly to cell phones.

The number and types of cell phones have exploded and promises to continue to proliferate for the foreseeable future. While new features and new apps have also continued to evolve, what has not changed is the method in which phones are grasped. Just like their dinosaur relatives, the house phone, they are grasped around the sides with fingers wrapping to the front. With many cell phone types, this can be problematic since various buttons are activated, frequently inadvertently, when grasping the phone on the side. While it is not a major issue to take a pic of your palm, grasping a cell phone on its sides, which are becoming thinner and thinner with each new phone model, puts the safety of the phone in jeopardy. Further, the wrap-around finger approach frequently obscures keys or viewing area requiring a finger shift. When a user has spent several hundreds of dollars for a smart phone, putting it at risk for shattering by a careless drop, while unthinkable, is a real possibility with existing technology. Lastly, the strap of the present invention stabilizes the phone when taking pictures, texting, navigating and allows one-handed photos, videos, selfies with less camera-phone movement improving quality in all operations.

It is among the objects of the present invention to provide a finger strap attachable to the back of the phone which can secure the phone with a single finger from a plurality of orthogonal directions making wrapping of fingers unnecessary or, at least, of secondary importance. Re-orientation of fingers then becomes easier and does not jeopardize the equipment. Several embodiments of attachment are described including integrally molded hooks, adhesively secured hooks, and a snap in hook-bearing chassis.

A second object of the present invention is to provide a quick-removal holster which safely retains the phone while permitting its rapid withdrawal to place or receive a call.

A third object of the present invention is to provide a clip which cooperates with the strap permitting the phone to be secured to a belt or virtually any item or surface in a variety of positions.

The cell phone case of the present invention can be manufactured from material selected from a rigid plastic, metal, and soft elastomeric materials.

Yet another object of the present invention is to provide for means to retain an ID and/or credit card(s) in the cell phone case making the carrying of a wallet or purse unnecessary. The retention means of the present invention includes a snap in feature accomplished by flexing of the credit card-sized article which prevents the ID/credit card from inadvertently falling out.

Another feature of the present invention is directed to a kick stand to allow the phone to be stood-up for hands-free viewing and utilization. The kick stand has a secondary feature of providing closure to the ID/credit card storage compartment providing streamlining of the case as well as enhanced security for the contents. In addition, the case may be provided with a pusher to facilitate removal of the stored cards.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which

FIG. 19C is an exploded view of an accessory useful with the fifth aspect;

FIG. 21A is a front perspective view of a sixth embodiment with an integral kickstand;

FIG. 21B is a cross-sectional side view of the sixth embodiment taken along line 21B-21B in FIG. 21 A;

FIG. 21C is a cross-sectional side view of the sixth embodiment taken along line 21C-21C in FIG. 21 A;

FIG. 21J is a front view of a seventh embodiment depicting a removable kickstand;

FIG. 21K is a cross-sectional side view of the seventh embodiment taken along line 21K-21K in FIG. 21J;

FIG. 21L is a front view of an additional accessory in the form of a credit card pusher;

FIG. 21M is a cross-sectional side view taken along line 21M-21M in FIG. 21L;

DETAILED DESCRIPTION OF THE PREFERRED EMBODIMENT(S)

Figure 1:
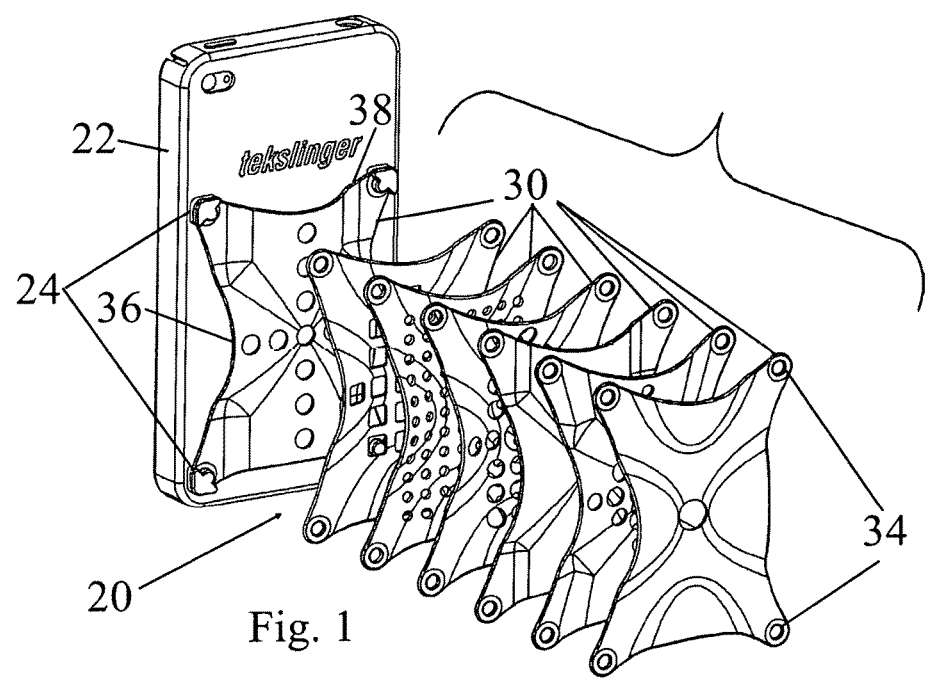
FIG. 1 is a front perspective view of a first embodiment of the cell phone strap of the present invention.
Figure 2:
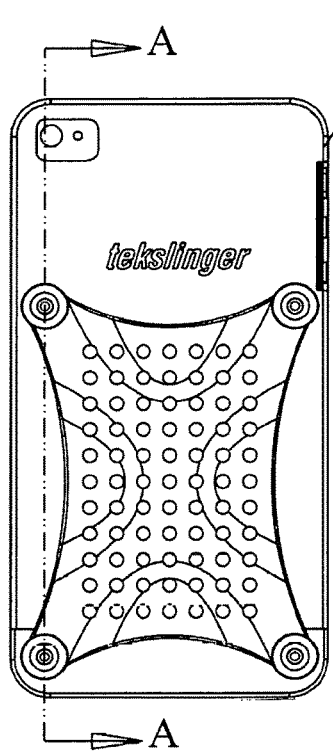
FIG. 2 is a front perspective view of a second embodiment.
Figure 3A:
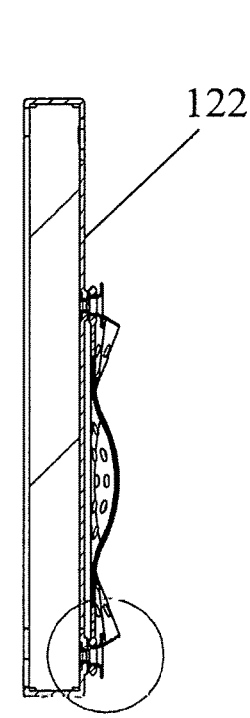
FIG. 3A is a cross-section taken along line A-A of FIG. 2.
Figure 3B:
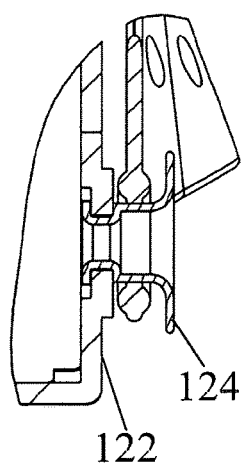
FIG. 3B is a enlarged detail of the portion of FIG. 3A shown in the circle.
Figure 18:
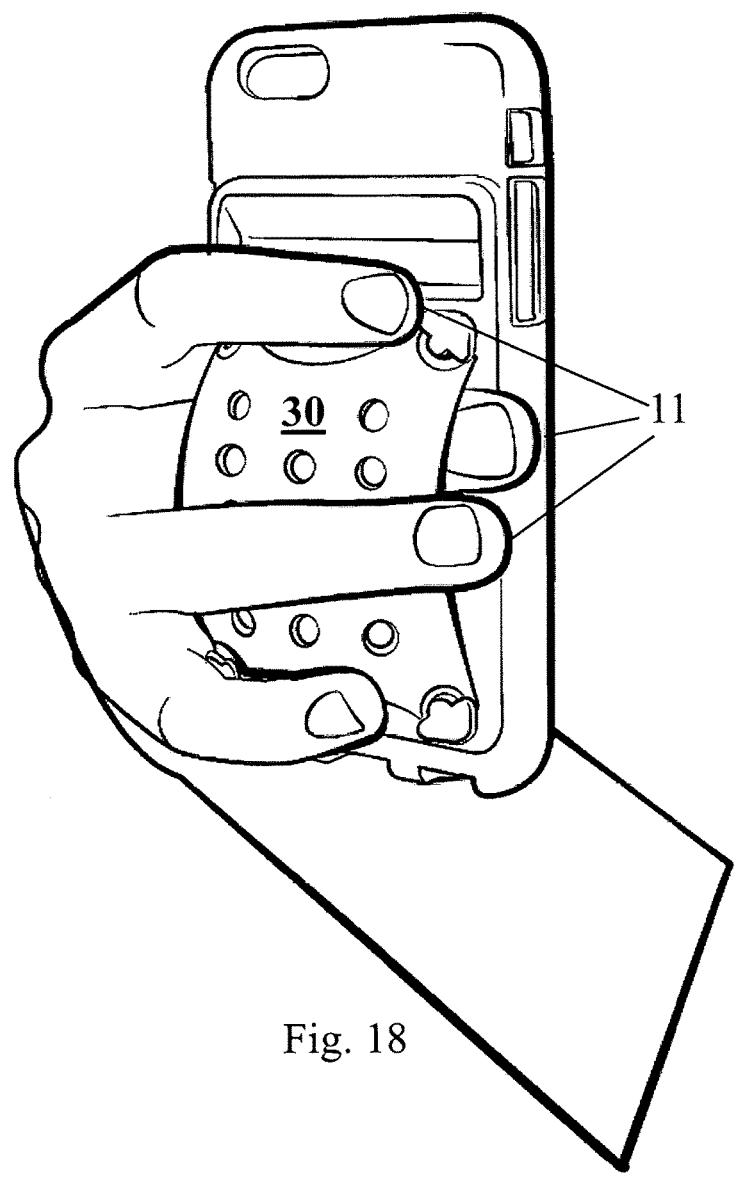
FIG. 18 is a rear perspective showing the cell phone strap engaged by a vertically-extending hand.
Figure 19:
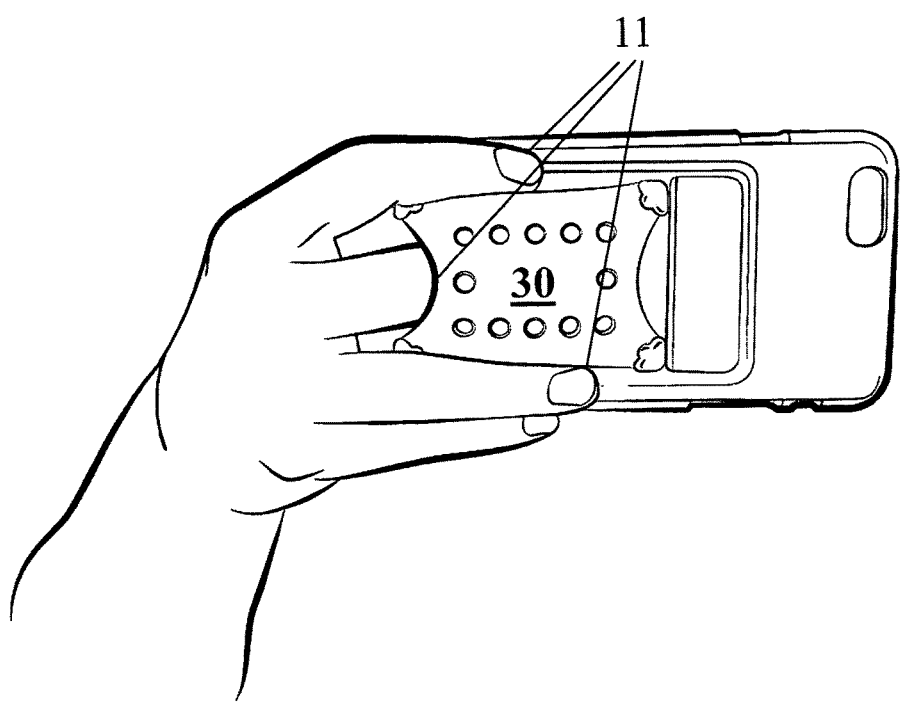
FIG. 19 is a rear perspective showing the cell phone strap engaged by a horizontally-extending hand.

A first embodiment of the of the present invention is depicted in FIG. 1 generally at 20. In this first embodiment, a cell phone case 22 is provided with a plurality of, specifically four are shown, hooks 24 integrally molded to the back of the case 22. Case 22 is molded to receive a specific size of cell phone. Hooks 24 are configured to facilitate reception of openings 34 of the straps 30 while resisting unintended removal. Hooks 24 provide the ability to quickly change the type/style of strap 30 mounted to case 22. Each strap 30 is configured with openings 34 which can be secured to hooks 24 by stretching the opening 34 over its respective hook 24. Seven different styles of stretchable straps 30 are depicted having different designs, hole patterns, etc. The configurational differences are representative of differing colors, prints, styles, and are not intended to be limited to those depicted. Similarly, while a stretchable material such as a man-made or natural elastomer is preferred for ease of assembly, the present invention contemplates the use of any fabric. Indeed, leather is adequately resilient for this intended use. While four hooks 24 and openings 34 are thought best, it is within the scope of the invention to incorporate any number of hooks/openings. Each strap 30 has a pair of lateral pockets 36 (one on each side) and longitudinal pockets 38 (one top, one bottom) to accommodate one or more of the user's fingers 11 (see FIGS. 18 and 19). As seen in those views, the wrapping of fingers 11 around the phone as was previously required, is now of secondary importance and can be done simply to steady the phone in the hand enabling easy finger relocation to accommodate accessing phone keys, texting, or simply clearing fingers from portions of the view screen. This frees up the user's phone-engaging thumb for texting, and the like.

Figures 4, 4A:
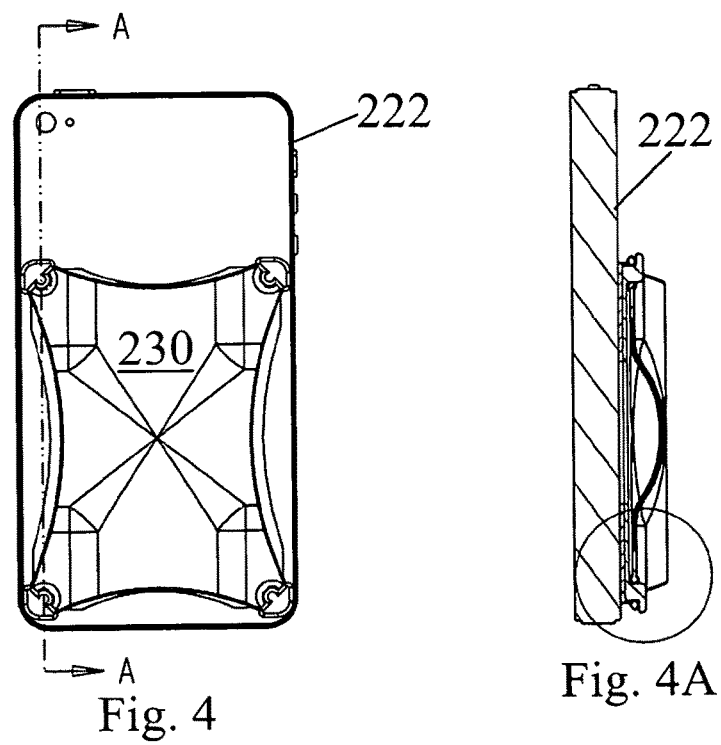
FIG. 4 is a front view of a third embodiment.
FIG. 4A is a cross-sectional view taken along A-A in FIG. 4.
Figure 4B:
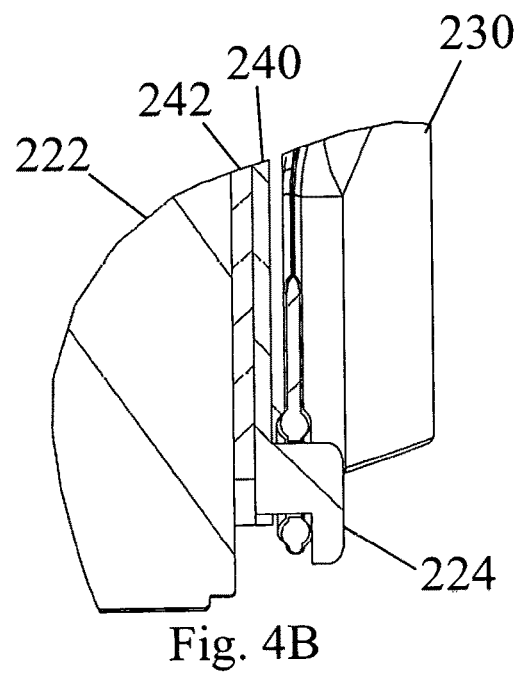
FIG. 4B is an enlarged detail of the portion of FIG. 4A shown in the circle.
Figure 5:
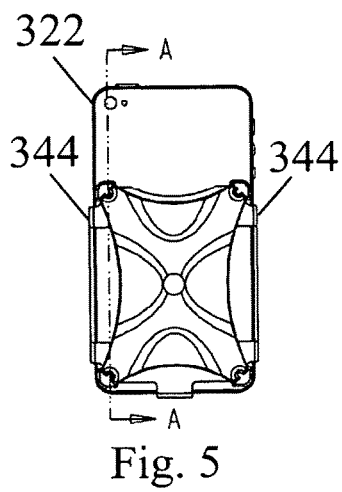
FIG. 5 is a front view of a fourth embodiment.
Figure 5A:
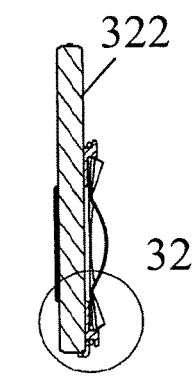
FIG. 5A is a cross-sectional view taken along A-A in FIG. 5.
Figure 5C:
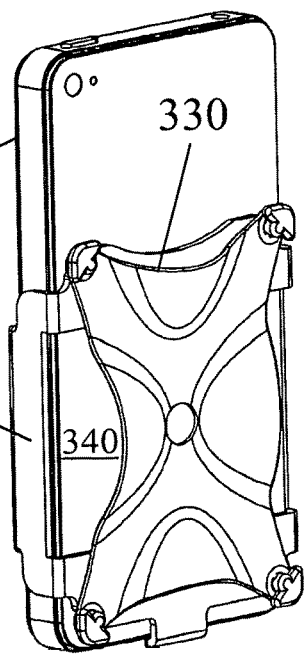
FIG. 5C is a front perspective view of the fourth embodiment.
Figure 5B:
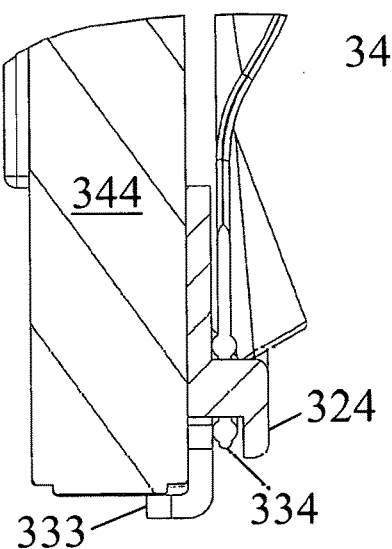
FIG. 5B is an enlarged detail of the portion of FIG. 5A shown in the circle.
Figure 6:
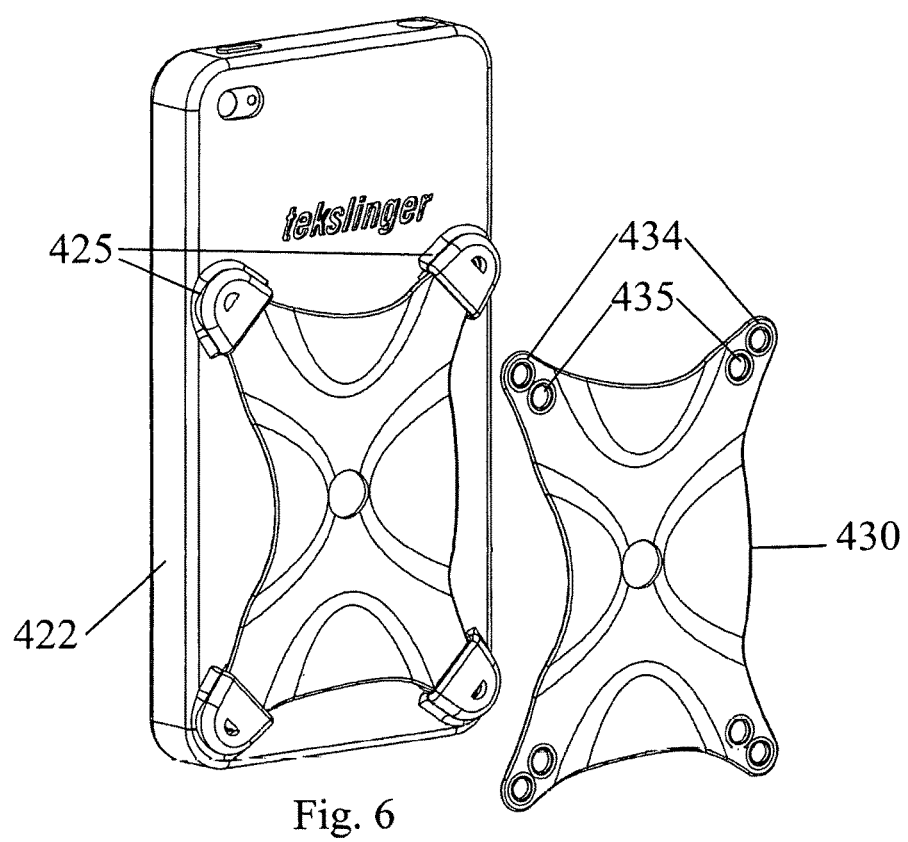
FIG. 6 is a front perspective view of the fifth embodiment.
Figure 7:
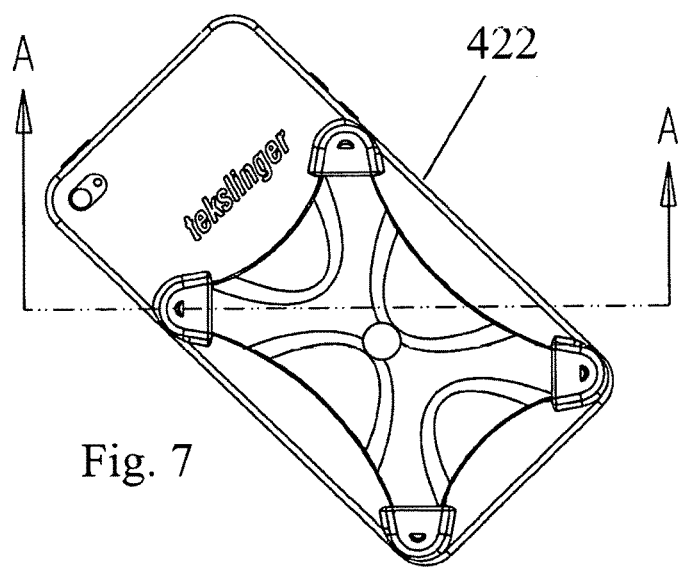
FIG. 7 is a front view of a fifth embodiment.
Figure 7A:
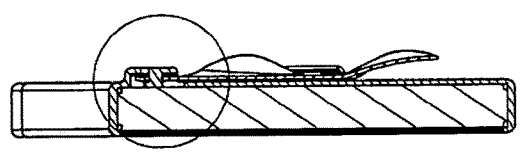
FIG. 7A is a cross-sectional view taken along A-A in FIG. 7.
Figure 7B:
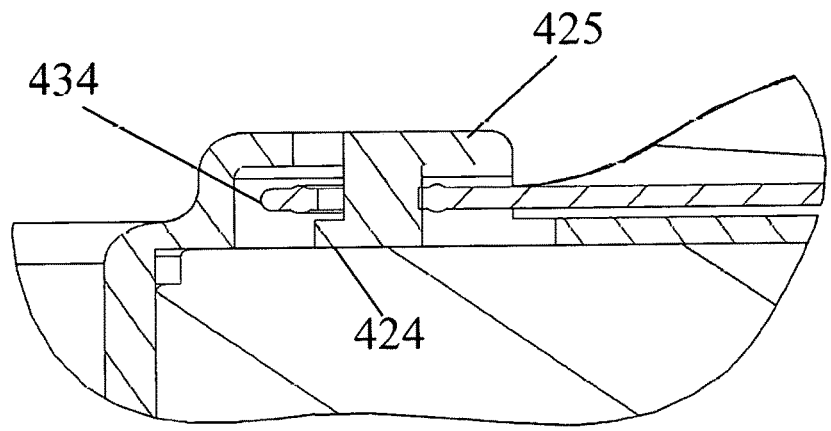
FIG. 7B is an enlarged detail of the portion of FIG. 7A shown in the circle.

Other embodiments are contemplated for retrofitting hooks to existing phone cases. See for example, FIGS. 2, 3, 3A and 3B, rivets 124 can be used to secure straps 130 to case 122. Alternatively, a chassis 240 equipped with hooks 224 can be secured to case 222 with adhesive layer 242 (FIGS. 4, 4A, 4B). Lastly, as depicted in FIGS. 5, 5A, 5B, 5C and 5D, chassis 340 can be formed with flanges 344 allowing hooks 324 to be snapped onto the case 322 so that cover 330 of any configuration or design may be secured to an existing phone design by stretching opening 334 over hook 324.

In the fifth embodiment depicted in FIGS. 6, 7, 7A, and 7B, hooks 424 are formed on the back side of overlapping cover 425 which thereby conceals the hooks. In addition, an alternative adjustment method is shown for covers 430 made of less flexible material. A second set of openings 435 are provided and, should they be used, the excess material occupied by openings 434 can be trimmed eliminating any overhang.

Figure 8:
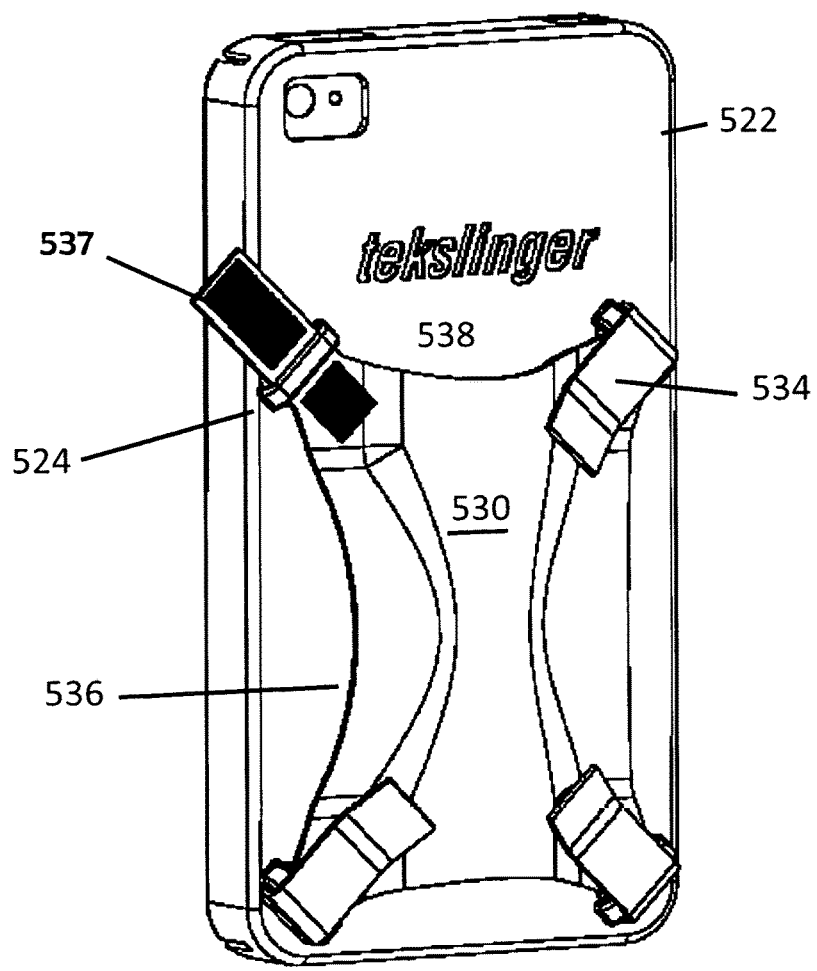
FIG. 8 is a front perspective view of a sixth embodiment.

In the sixth embodiment depicted in FIG. 8, loops 524 replace the hooks of the previous embodiments and adjustable straps 534 equipped with hook-and-loop fabric (commercialized under the registered mark VELCRO) 537 attached to the underneath faces. Accordingly, the sizes of pockets 536 and 538 can be adjusted to accommodate the finger sizes and preferences (i.e., one finger, two fingers) of the user.

Figure 9:
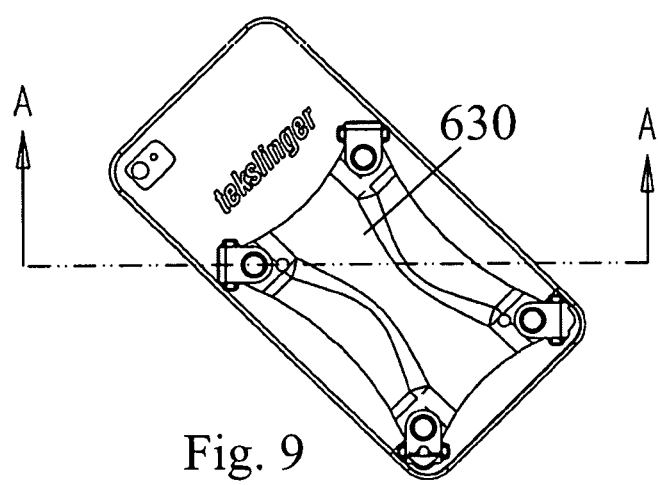
FIG. 9 is a front view of a seventh embodiment.
Figure 9A:
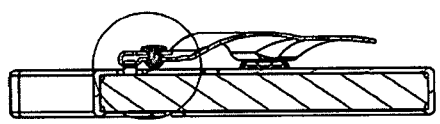
FIG. 9A is a cross-sectional view taken along A-A in FIG. 9.
Figure 9B:
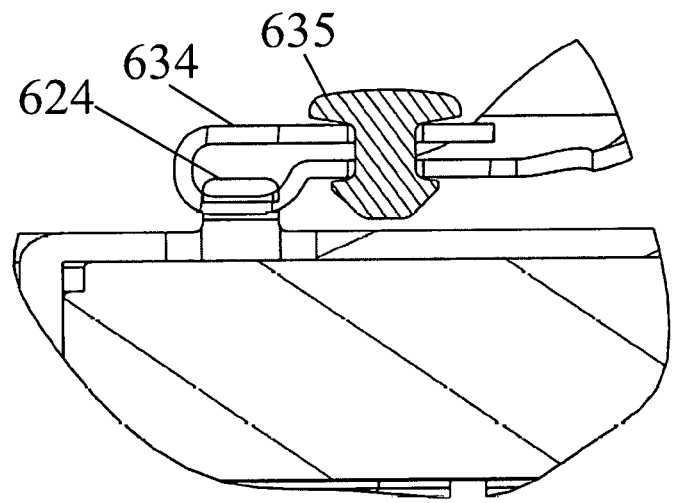
FIG. 9B is an enlarged detail of the portion of FIG. 9A shown in the circle.

In the seventh embodiment depicted in FIGS. 9, 9A, and 9B, loops 624 are utilized with straps 634 being secured by rivets 635. While the rivets do not accomplish the adjustability afforded by the straps of the previous embodiment, this flexibility can be restored by attaching differing styles and sizes of cell phone straps 630.

Figure 10:
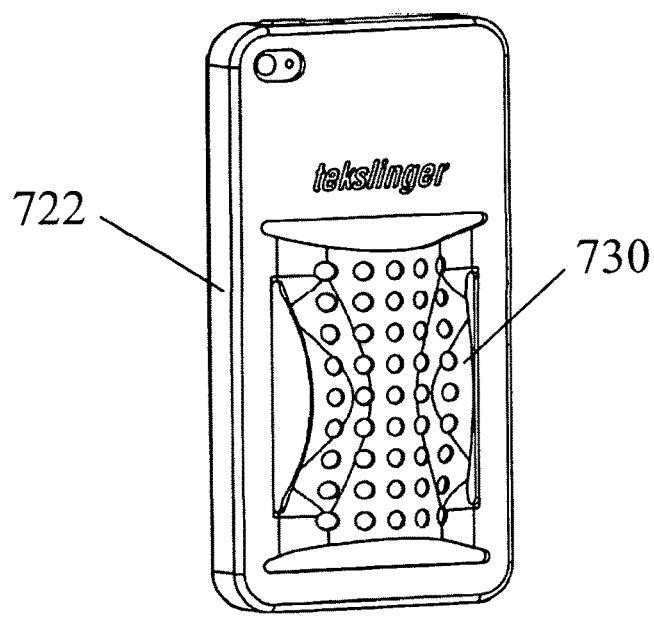
FIG. 10 is a front perspective view of a eighth embodiment.
Figure 10A:
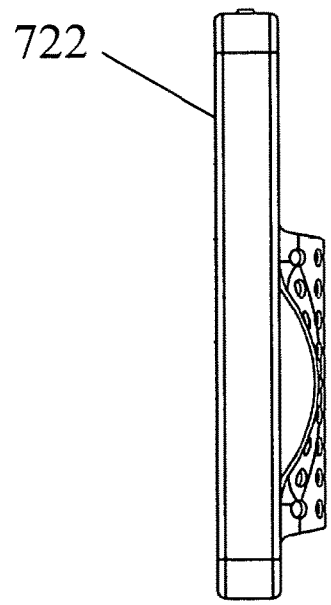
FIG. 10A is a side view of the embodiment shown in FIG. 10.
Figure 10B:
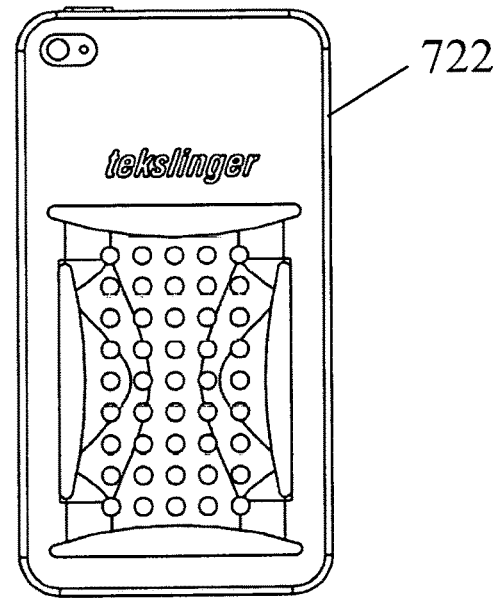
FIG. 10B is a front view of the FIG. 10 embodiment.

In the eighth embodiment of FIGS. 10, 10A, and 10B, strap 730 is secured directly to the casing 722 as by adhesive bonding, for example. The manner of attachment is not at issue here. For this embodiment, the important feature is that for all intents and purposes, the strap 730 is formed as an integral part of casing 722 and may be injection molded as a unit using an over-molding technique.

Figures 17A, 17B:
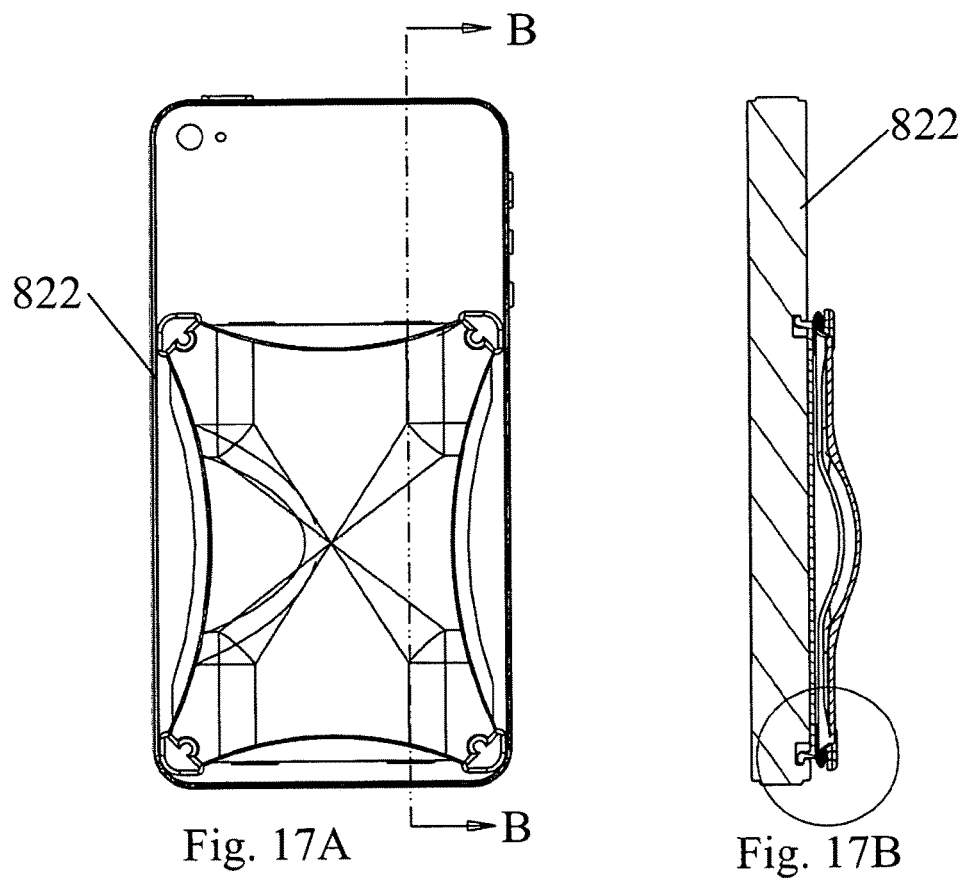
FIG. 17A is a front view of a ninth embodiment.
FIG. 17B is a cross-sectional view taken along B-B in FIG. 17.
Figure 17C:
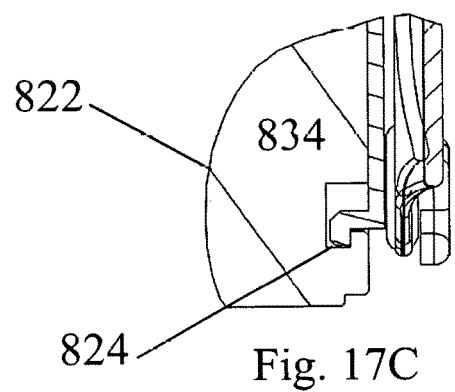
FIG. 17C is an enlarged detail of the portion of FIG. 17A shown in the circle.

In a ninth embodiment depicted in FIGS. 17A, 17B, and 17C, lipped slots 824 are formed in the casing 822 and protruding feet 834 are formed to fit therein such that chassis 840 is secured to the casing and provides means to attach cover 830 in any of the manners taught in the preceding embodiments. The drawing depicts a concealed hook of the style described in conjunction with the fifth embodiment.

Figure 11A:
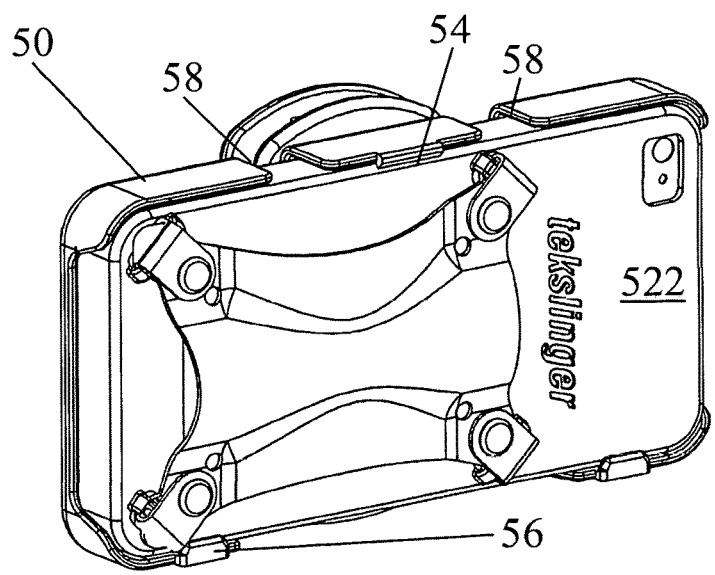
FIG. 11A is a front perspective view of a quick-removal holster of the present invention with a phone in place.
Figure 11B:
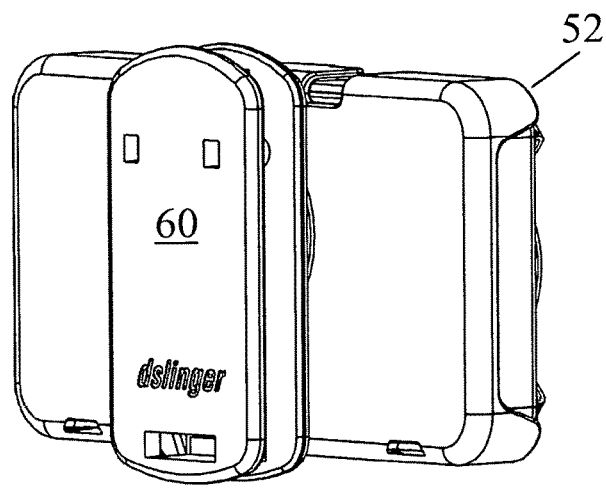
FIG. 11B is a rear perspective view of the holster shown in FIG. 11A.
Figure 12A:
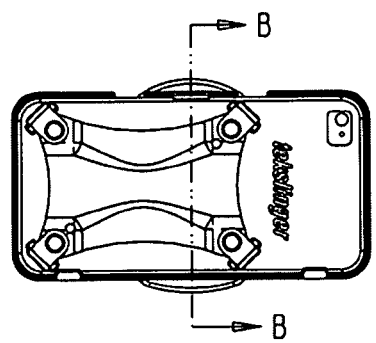
FIG. 12A is a front view of the quick-removal holster of FIG. 11A.
Figure 12B:
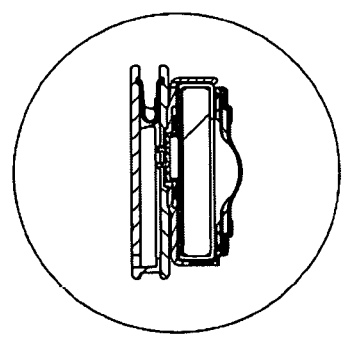
FIG. 12B is a cross-sectional view taken along line B-B of FIG. 12A.
Figure 12C:
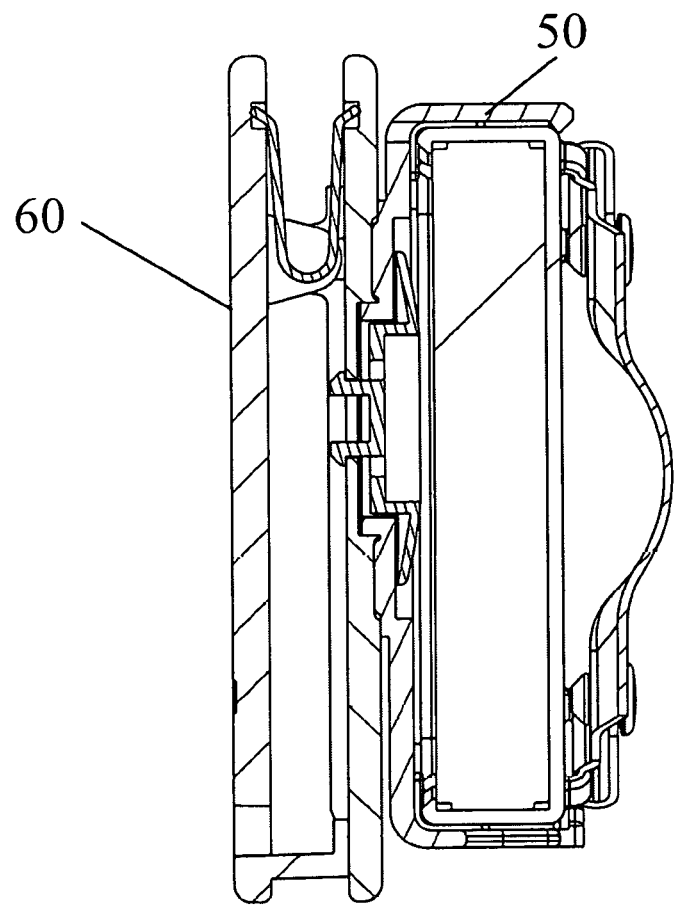
FIG. 12C is an enlargement of the portion shown in the circle of FIG. 12B.
Figure 13A:
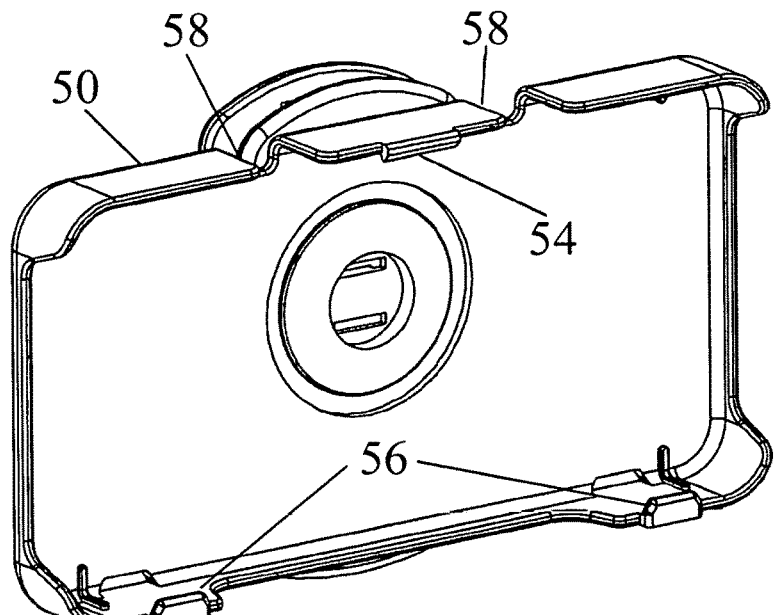
FIG. 13A is a front perspective view of the quick-removal holster of FIG. 11A *empty;*
Figure 13B:
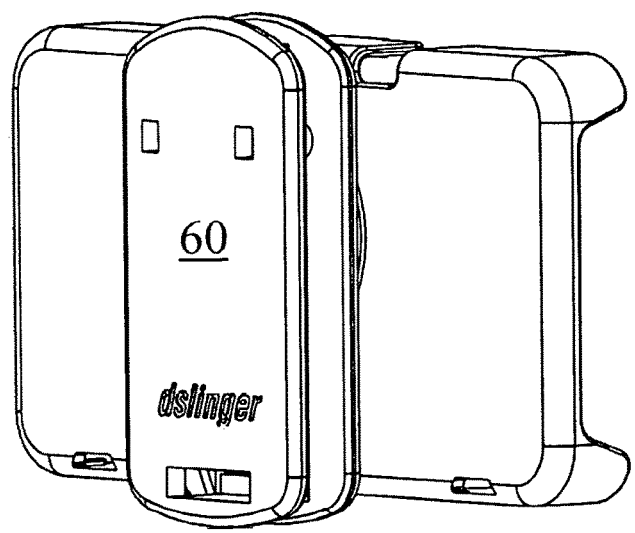
FIG. 13B is a rear perspective view of the quick-removal holster shown in FIG. 13A.

FIGS. 11A, 11B, 12A, 12B, 12C, 13A and 13B depict a quick-removal holster 50 for securing a cell phone 522 with adjustable straps 534 shown in FIG. 11A. Holster 50 has one essentially open side 52 into which fingers 54 and 56 extend. Fingers 54 and 56 will flex to permit the egress and ingress of phone 522. Slots 58 facilitate removal of phone 522. With corners 59 surrounding phone 522, it is fully secured within holster 50. Accordingly, unlike some styles of phone holsters where the phone may be inadvertently pushed from its resting place or the holster pivot and disgorge its contents unbeknownst to the wearer, holster 50 holds its phone securely while still allowing easy removal. A spring clip 60 is rotationally attached to the body of holster 50. Similar clips are widely used with other cell phone holster designs.

Figure 14B:
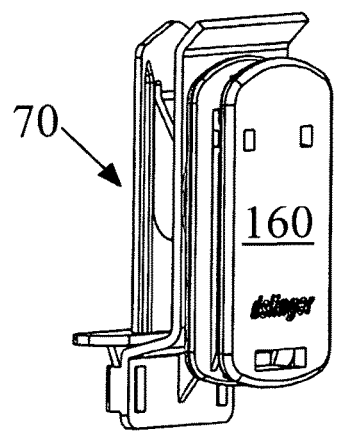
FIG. 14B is a rear perspective view of the belt clip shown in FIG. 14.
Figure 14C:
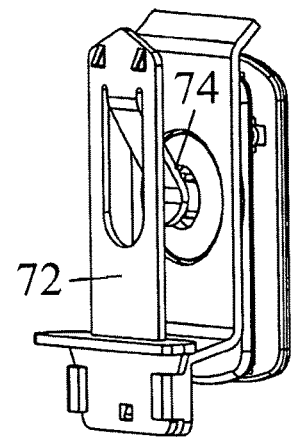
FIG. 14C is a front perspective view of the belt clip shown in FIG. 14.
Figure 14:
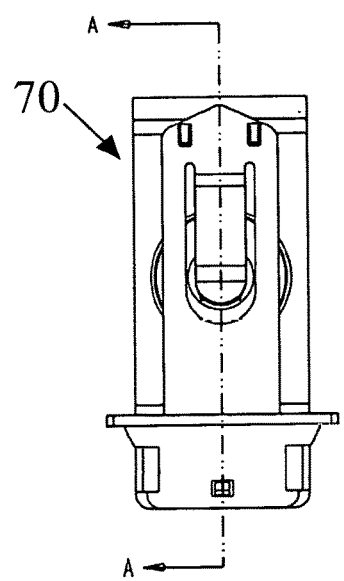
FIG. 14 is a front view of a belt clip useful with the cell phone strap of the present invention.
Figure 14A:
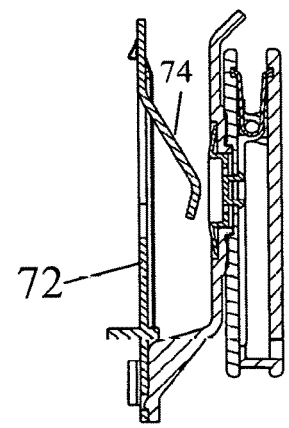
FIG. 14A is a cross-sectional view of the belt clip shown in FIG. 14.
Figure 15B:
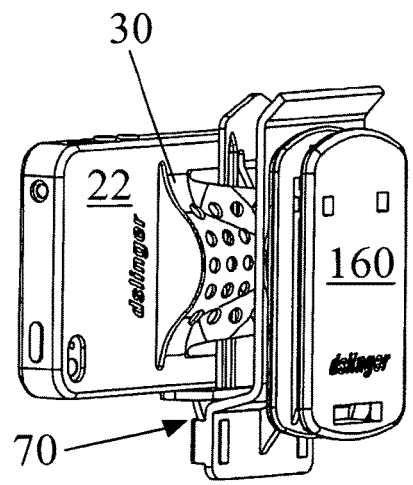
FIG. 15B is a rear perspective view of the belt clip shown in FIG. 15.
Figure 15C:
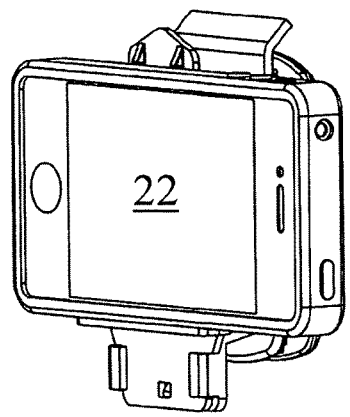
FIG. 15C is a front perspective view of the belt clip shown in FIG. 15.
Figure 15:
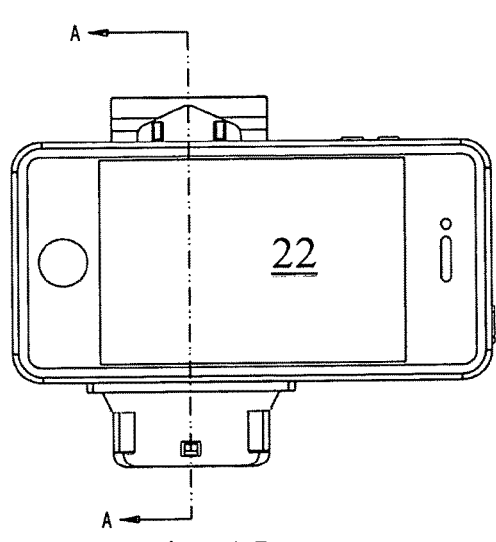
FIG. 15 is a front view of the belt clip of FIG. 14 shown holding a phone.
Figure 15A:
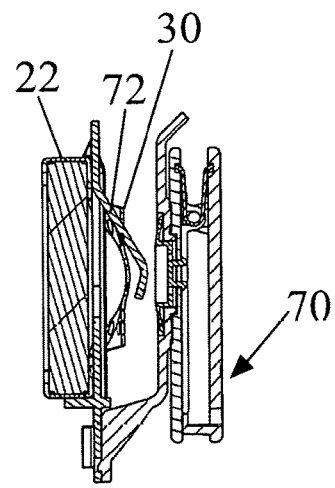
FIG. 15A is a cross-sectional view of the belt clip shown in FIG. 15.

A belt clip 70 is shown in FIGS. 14-15C that is adapted for use with the straps 30 of the present invention. As best seen in FIGS. 14A and 15A, belt clip includes a conventional spring clip 160 to which is rotationally attached a secondary shaped member 72 having a spring finger 74 protruding toward the center of the U. Any of the straps 30 previously disclosed can be hung over spring finger 74 which serves as an "artificial finger" filling one of the lateral or longitudinal pockets of the strap 30, thereby securing cell phone 22 in position on belt clip 70 without having to squeeze (and thereby potentially, mar) the surface of the phone 22.

Figures 16, 16A:
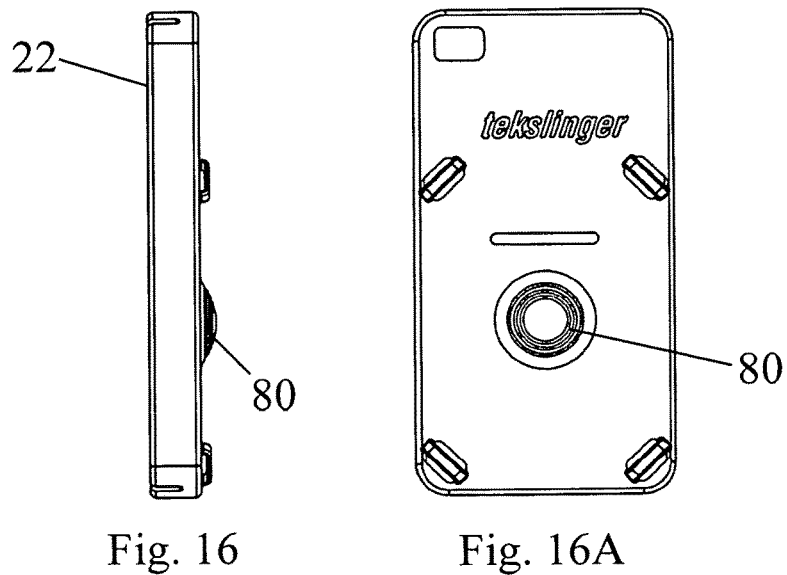
FIG. 16 is a side view of a fourth aspect of the present invention.
FIG. 16A is a front view of the element shown in FIG. 16A.
Figure 16B:
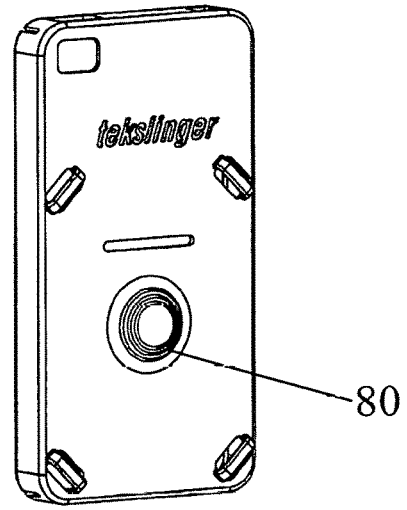
FIG. 16B is a front perspective of FIG. 16.

FIGS. 16, 16A and 16B depict a convenience/comfort feature which may be used with any of the embodiments disclosed herein, or on any existing cell phone. An elastomeric protrusion 80 is secured to the back surface of casing 22 at the point a user's finger will typically be positioned under a strap of the present design. This comfort bump 80 will allow a more normal positioning of the user's finger and reduce the possibility of hyper-extension during extended cell phone usage.

Figure 19A:
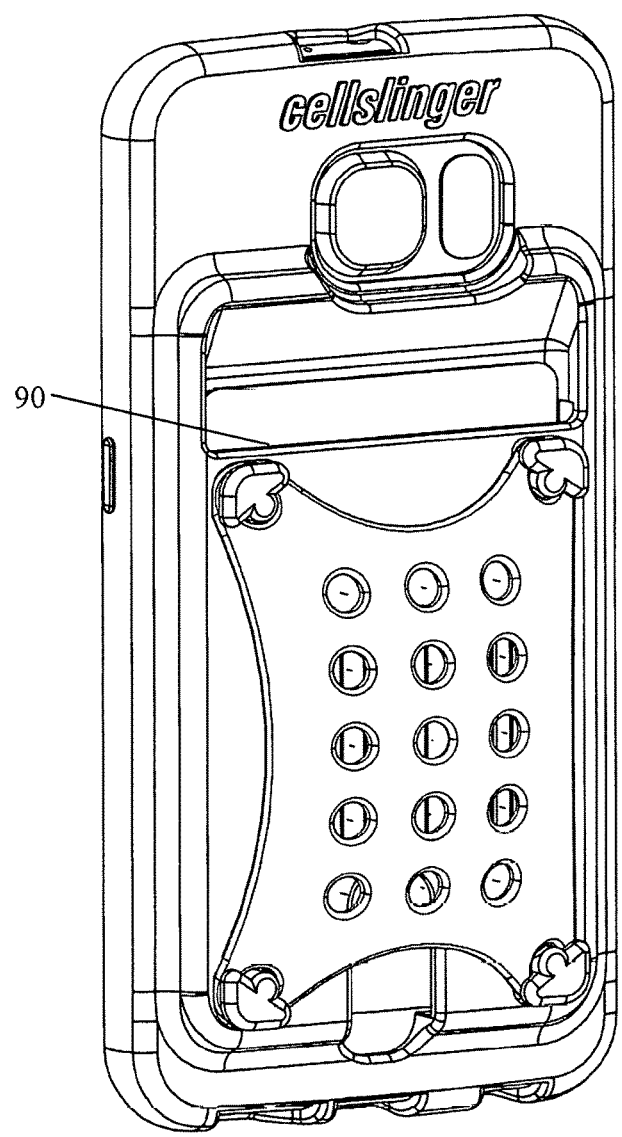
FIG. 19A is a front perspective view of a fifth aspect of the present invention.
Figure 19B:
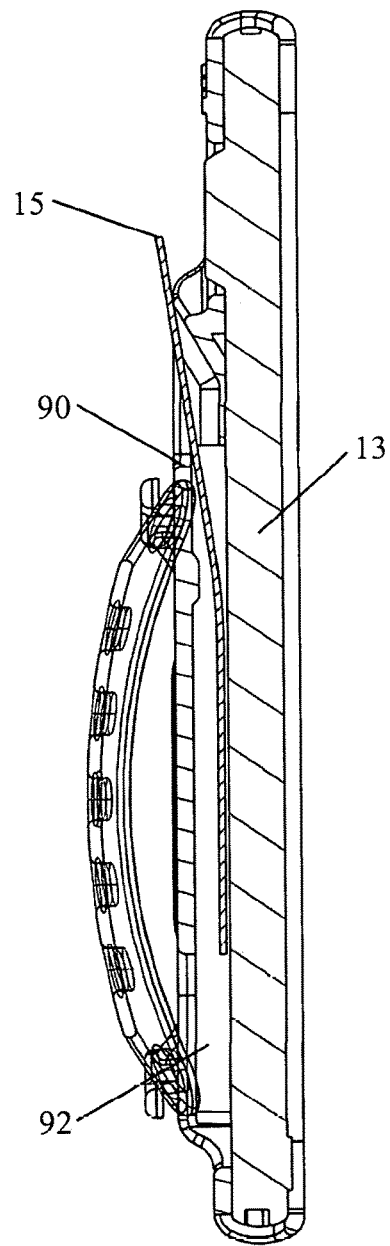
FIG. 19B is a cross-sectional side view of the FIG. 19A element.
Figure 19:
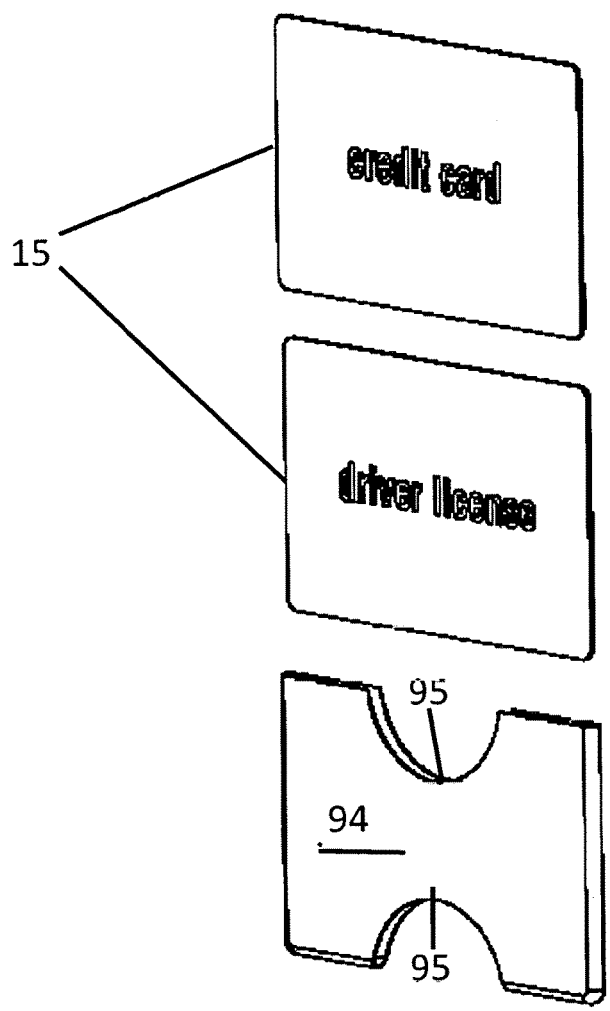

FIGS. 19A, 19B and 19C depict a second convenience/comfort feature which may be used with any of the embodiments disclosed herein, or on any existing cell phone. With the existing technology, runners, walkers, shoppers, etc., would often prefer to travel light, i.e., to not have to carry a wallet or purse. However, it becomes a problem as to what to do with one's driver's license and/or credit card. As a convenience feature of the present invention, the back side 23 of case 22 may be optionally formed with a recess/slot 90 at the top of a compartment 92 which may accommodate up to 3 credit card-sized items 15 including a driver's license or other form of ID. These items are retained in compartment 92 and lie in a plane adjacent the back surface of cell phone 13. Case 22 can be made from material selected from a rigid plastic, metal, and soft elastomeric materials.

Figure 20:
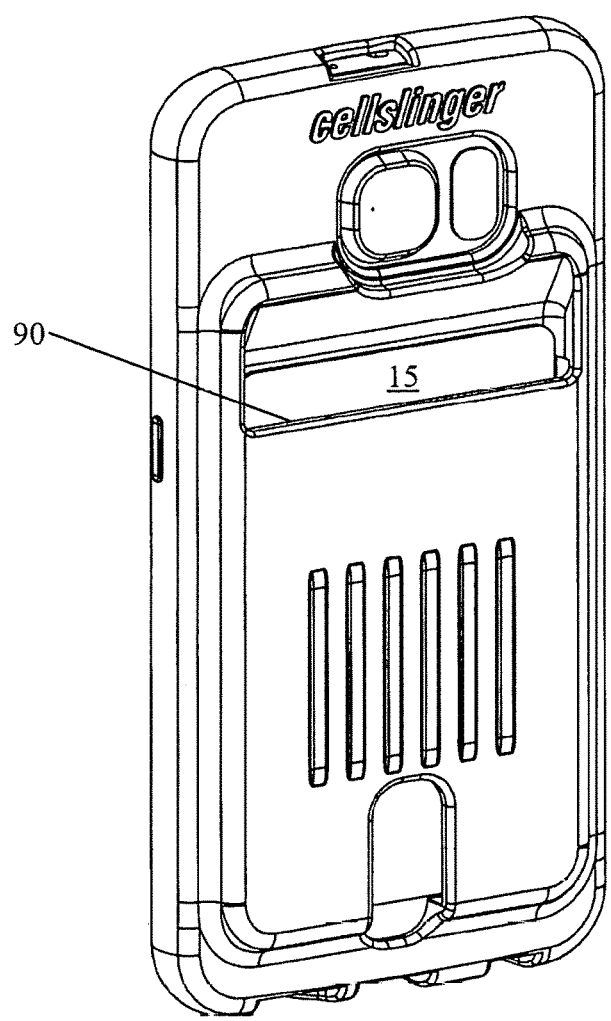
FIG. 20 is a front perspective view of the fifth aspect used without the strap.
Figure 21D:
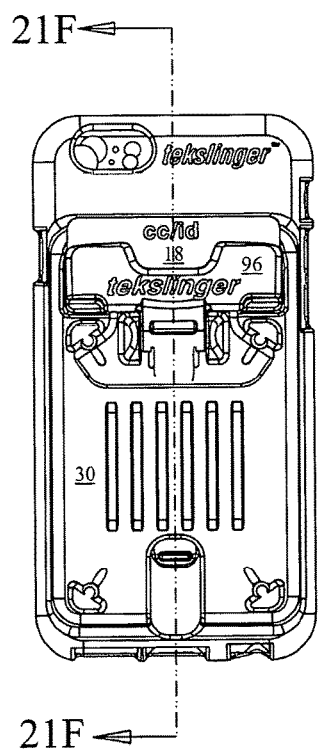
FIG. 21D is a front view of a seventh embodiment depicting a removable kickstand.
Figure 21E:
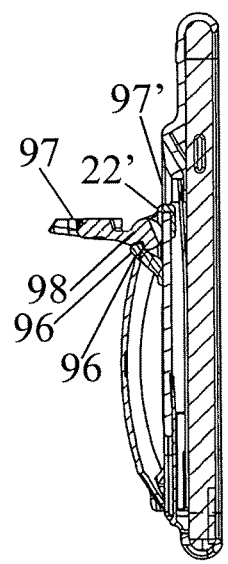
FIG. 21E is a cross-sectional side view taken along line 21F-21F in FIG. 21E.
Figure 21F:
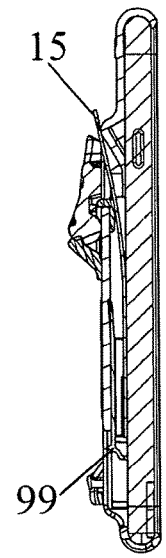
FIG. 21F is a cross-sectional side view similar to that shown in FIG. 21E with the credit-card sized item protruding from the opening.
Figure 21G:
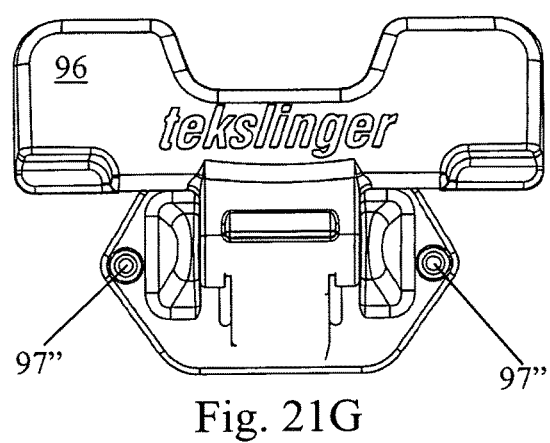
FIG. 21G is a front view of an eighth embodiment featuring an additional kickstand.
Figure 21H:
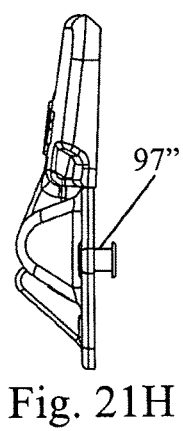
FIG. 21H is a side view of the eighth embodiment.

If desired, a convenience pouch 94 (FIG. 19C) may be provided into which a credit card and driver's license (or pair of credit cards) may be inserted prior to insertion into recess 90. Thumb slots 95 on both top and bottom edges of pouch 94 facilitates insertion and removal of credit card-sized items 15. FIG. 20 shows recess 90' used in casing 22' without the use of finger strap 30 shown used in other embodiments. Due to the rigidity of case 22, 22', the credit card, ID, etc., will need to flex to enter recess 90, 90' as best seen in FIG. 19B. The size of pouch 94 causes the credit card sized objects to snap or lock into the recess. Obviously, recess 90, 90' could be formed to accommodate more than 2-3 credit card-sized items, should market demand require, the preference for the 2-3 card design being to keep the overall profile slim.

A further feature of the present invention shown in FIGS. 21A-22C, is a pivoting kick stand 96. In the embodiment shown in FIG. 21A-B, the kick stand is molded directly to the case with flap 97 pivoting about axle 98. In the stored position shown in FIG. 21A, flap 97 lies tight to case 22 and forms a protective hood for the credit card-sized articles 15. A pusher 99 receives the bottom edges of articles 15 and facilitates removal thereof by simple engagement of pusher 99 by the user's thumb or finger moving the articles 15 toward the opening (FIG. 21F). Flap 97 can be folded downwardly to provide a clear path for removal of articles 15 with or without utilization of the convenience pouch 94. However, as shown in FIG. 21F, there is adequate clearance for removal and insertion of the card with the kickstand 96 in its stored position. In the embodiment depicted in FIGS. 22D-F, kick stand 96 is formed with a hook 97' allowing it to be slipped over an upwardly extending edge 22' of case 22. Spring 96' engages in slot 96" in flap 97 retaining it in its extended position. Alternatively, the kick stand 96 may be attached using rivets 97" (FIGS. 21G-H).

Figure 22A:
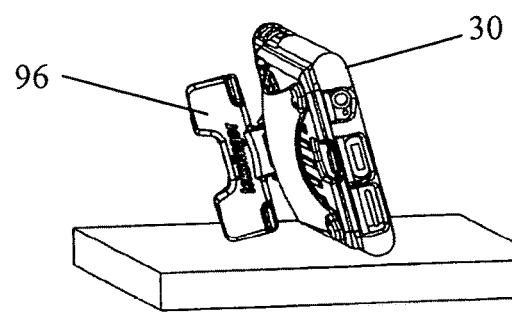
FIG. 22A is a rear perspective view of the kickstand in a first deployed position.
Figure 22B:
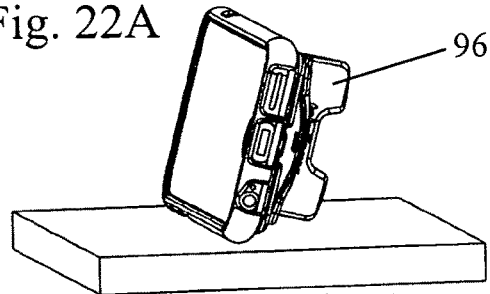
FIG. 22B is a front perspective view of the kickstand as depicted in FIG. 22A.
Figure 22C:
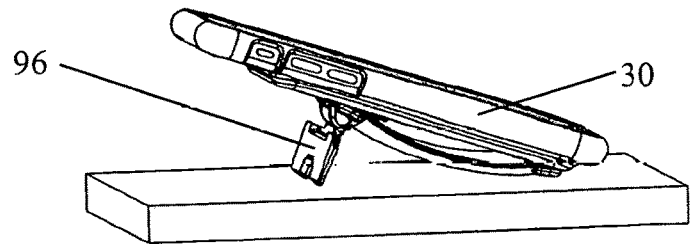
FIG. 22C is a front perspective view of the kickstand with the phone rotated by 90°.

As seen in FIGS. 22A-C, kick stand 96 allows the hands-free use of the phone. The phone may be viewed/used horizontally as in FIGS. 22A and B or vertically as seen in FIG. 22C. The finger strap 30 is configured to permit unimpeded movement of kick stand 96 and insertion and removal of articles 15 into and out of recess 90.

Various changes, alternatives, and modifications will become apparent to a person of ordinary skill in the art after a reading of the foregoing specification. For example, the features of this invention can be equally applied to other devices such as iPods and tablets. In addition, it is envisioned that an OEM may wish to mold the attachment means directly into the back of its electronic device rather than to a casing that receives the device. It is intended that all such changes, alternatives, and modifications as fall within the scope of the appended claims be considered part of the present invention.

I claim:

1. A rigid plastic case for retaining a cell phone, said rigid plastic case comprising:
   a) a rectangular case of rigid plastic material molded to receive a specific cell phone, said rectangular case having a plurality of attachment means positioned about it periphery;
   b) a finger strap formed as a generally rectangular body of flexible material having four corners which define a plurality of finger-receiving pockets, each of said plurality of pockets being of a size inadequate to accommodate a user's entire hand, said generally rectangular body of flexible material having a plurality of securement means positioned adjacent said four corners adapted for connection to said plurality of attachment means of said rectangular case;

c) said rectangular case having a back side with a compartment formed therein with an access slot for receiving at least one credit card-sized article to lie along a back surface of the cell phone, said case being formed of a sufficiently hard material as to require the credit card-sized articles to flex in order to enter and be removed from said compartment, this flexing causing the credit-card sized article to lock in said compartment;

d) a kick stand hingedly connected to said back side, said kick stand having a retracted position in which it folds above an upper opening of said compartment physically and visually protecting the credit card-sized articles therein.

2. The case of claim 1 wherein said case is made of a material selected from a rigid plastic, metal, and soft elastomeric materials.

3. The case of claim 1 further comprising a convenience pouch into which the credit card-sized articles are inserted prior to being installed in said compartment.

4. The case of claim 1 wherein said plurality of attachment means further comprises a plurality of hooks formed on said back side, said hooks engaging loops formed on said finger strap designed to permit substantially hands-free utilization of the cell phone and quick change of said finger strap.

5. The case of claim 1 further comprising a slidable pusher adapted to engage one end of the credit-card sized article and facilitate its removal from said compartment.

6. The case of 1 wherein said kick stand is fixedly attached to a rear portion of said rigid case.

7. The case of claim 6 wherein said kick stand is fixedly attached to the rear portion of said case by rivets.

8. The case of claim 1 wherein said kick stand is removably attached to a rear portion of said rigid case.

9. The case of claim 1 further comprising a comfort bump formed on a back portion of said case beneath the finger strap.

* * * * *